US012785514B2

(12) United States Patent
Straßer

(10) Patent No.: US 12,785,514 B2
(45) Date of Patent: Nov. 3, 2026

(54) EXTERNALLY EXCITED SYNCHRONOUS MACHINE AND MOTOR VEHICLE

(71) Applicant: AUDI AG, Ingolstadt (DE)

(72) Inventor: Roman Straßer, Gaimersheim (DE)

(73) Assignee: Audi AG, Ingolstadt (DE)

( * ) Notice: Subject to any disclaimer, the term of this patent is extended or adjusted under 35 U.S.C. 154(b) by 512 days.

(21) Appl. No.: 18/340,782

(22) Filed: Jun. 23, 2023

(65) Prior Publication Data

US 2024/0014712 A1 Jan. 11, 2024

(30) Foreign Application Priority Data

Jul. 5, 2022 (DE) ......................... 102022116680.5

(51) Int. Cl.

*H02K 11/25* (2016.01)
*H02K 1/22* (2006.01)
*H02K 11/30* (2016.01)
*H02K 13/00* (2006.01)
*H02K 13/10* (2006.01)

(52) U.S. Cl.

CPC ............... *H02K 11/25* (2016.01); *H02K 1/22* (2013.01); *H02K 11/30* (2016.01); *H02K 13/003* (2013.01); *H02K 13/10* (2013.01)

(58) Field of Classification Search

CPC ...... H02K 13/10; H02K 13/003; H02K 19/36; H02K 11/35; H02K 11/30; H02K 1/22; H02K 11/25; H02K 19/28

See application file for complete search history.

(56) References Cited

U.S. PATENT DOCUMENTS

| | | | | |
|---|---|---|---|---|
| 3,577,002 | A * | 5/1971 | Hall | H02K 19/34 290/46 |
| 8,508,179 | B2 | 8/2013 | Schmidt et al. | |
| 2017/0067964 | A1 * | 3/2017 | Dumas | B60L 9/22 |

FOREIGN PATENT DOCUMENTS

| | | | | |
|---|---|---|---|---|
| CN | 209134239 U | | 7/2019 | |
| CN | 112968634 A | * | 6/2021 | H02P 6/32 |
| DE | 102008032210 A1 | | 1/2010 | |
| DE | 102010040857 A1 | * | 3/2012 | H02K 29/08 |
| DE | 102011055137 A1 | | 5/2013 | |
| DE | 102012006559 A1 | | 10/2013 | |

(Continued)

OTHER PUBLICATIONS

KR-20150122468-A machine translation Oct. 30, 2025.*

(Continued)

*Primary Examiner* — Leda T Pham

(74) *Attorney, Agent, or Firm* — Seed Intellectual Property Law Group LLP

(57) ABSTRACT

An externally excited synchronous machine having an exciter circuit, a stator, and a rotor. The rotor carries at least one exciter winding which, in operation, generates an exciter field, wherein the exciter winding, in operation, is excited by the exciter circuit along a power supply pathway, wherein the rotor includes at least one temperature sensor device having a communication device which, in operation, transmits a communication signal regarding a temperature of the rotor to at least one evaluation device, and wherein the communication signal is transmitted from the communication device to the evaluation device by a transmission route at least partially formed by a section of the power supply pathway.

13 Claims, 2 Drawing Sheets

(56) References Cited

FOREIGN PATENT DOCUMENTS

| | | | | | |
|---|---|---|---|---|---|
| DE | 102017006952 | A1 | | 1/2019 | |
| DE | 102019205992 | A1 | | 10/2020 | |
| DE | 102020215448 | A1 | | 6/2022 | |
| DE | 102022213833 | A1 | * | 12/2023 | ........... H02K 11/215 |
| KR | 20150122468 | A | * | 11/2015 | ............. H02K 29/00 |

OTHER PUBLICATIONS

DE-102022213833-A1 machine translation Oct. 30, 2025.*
DE-102010040857-A1 machine translation Oct. 30, 2025.*
CN-112968634-A machine translation Oct. 30, 2025.*

* cited by examiner

EXTERNALLY EXCITED SYNCHRONOUS MACHINE AND MOTOR VEHICLE

BACKGROUND

Technical Field

The disclosure relates to an externally excited synchronous machine having a rotor and a stator, wherein the rotor carries at least one exciter winding for generating an exciter field of the synchronous machine, wherein the exciter winding can be energized by an exciter circuit of the synchronous machine along a power supply pathway. In addition, the disclosure relates to a motor vehicle.

Description of the Related Art

Electric machines are being used increasingly as drive machines in motor vehicles. Thus far, permanently excited synchronous machines are used predominantly as the main drive unit in purely electric drive systems. On the other hand, asynchronous machines are used primarily as auxiliary drives or in the field of all-wheel or single-wheel drive systems. Typically, magnets containing rare earth elements are used for high-power permanently excited synchronous machines, such as are necessary for the drive system of motor vehicles, and the corresponding materials are relatively costly, especially when high field strength and/or high temperature resistance is required. Furthermore, only a few sources are available for some of the relevant materials, so that in terms of cost efficiency and supply chain safety it is becoming increasingly relevant to use externally excited instead of permanently excited synchronous machines.

In externally excited synchronous machines, similar to the case of asynchronous machines, the heaviest thermal load typically occurs in the rotor. This is generally not critical in the motor vehicle industry for asynchronous machines, since these are only used briefly in high power ranges as boost or all-wheel drives. In the case of externally excited synchronous machines used as the main drive, on the other hand, it is highly relevant to take the rotor temperature into account.

One possible approach to doing this is to calculate or estimate the rotor temperature based on the operating parameters of the synchronous machine, although this is relatively prone to error. Therefore, the machine cannot be fully utilized, or not operated up to its actual temperature limit, which means that machines need to be overdimensioned for a given demanded power. The erroneous temperature estimation can thus result in needlessly large weight and use of design space of the synchronous machine as well as higher costs.

Publication DE 10 2017 006 952 A1 already discloses one approach to the monitoring of the temperature of an externally excited synchronous machine, in which the current for providing the exciter field is inductively transmitted to the rotor. By variation of the frequency used for the inductive transmission, the resonance frequency of the energy transmission system is determined, which in turn is dependent on the temperature of the rotor-side components. This procedure can only be used for an inductive energy transmission to the rotor. Furthermore, components used for the inductive energy transmission are often significantly distant from the potentially hottest spots of the rotor, so that the temperature there can only be relatively roughly estimated. Furthermore, the requirement of a variable frequency for the inductive energy transmission results in increased implementation expense.

It is already known from publication KR 2015 0122 468 A how to arrange temperature sensors in a rotor and how to read them out via slip contacts. However, this means that additional slip contacts are required between the rotor and the stator, which increases the use of design space and the internal friction in the electric machine.

BRIEF SUMMARY

Therefore, embodiments of the disclosure provide an externally excited synchronous machine which is improved in terms of detecting or estimating the rotor temperature.

More particularly, embodiments of the disclosure provide an externally excited synchronous machine of the mentioned kind, wherein the rotor comprises at least one temperature sensor device, having a communication device serving for the transmission of a communication signal regarding a temperature of the rotor to at least one evaluation device, wherein the transmission route for the transmission of the communication signal from the communication device to the evaluation device is formed at least partly by a section of the power supply pathway.

The disclosure is based on the idea of making additional use of the power supply pathway already present and necessary to the energization of the exciter winding for relaying communication signals of the communication device and thus information regarding the rotor temperature from the rotating system of coordinates of the rotor to the stationary system of coordinates of the stator. As will be further explained later on, this method can be used both in managing the power supply pathway across slip rings and in an inductive energy transmission and it is thus flexible for various types of externally excited synchronous machines. By co-opting the power supply pathway for the communication signal transmission, furthermore, no additional contacts or transmission pathways are required between the rotor and the stator, so that the solution according to the disclosure is especially efficient in terms of design space and it can avoid additional friction losses in the synchronous machine.

The using of power supply pathways for communication is already known from other fields of application, such as in the field of home networking, so that corresponding approaches will not be explained in detail. Basically, an additional modulation signal is modulated onto the DC or alternating voltage present in the power supply pathway. This signal can be separated from the network voltage by filtering or demodulation, for example. When the communication signal is superimposed with an alternating voltage it is advisable for the frequencies used in the communication signal, i.e., a carrier frequency for example, to be sufficiently far apart from the frequency of the alternating voltage, in order to enable a clear separating. This is relevant in the synchronous machine according to the disclosure, for example, because there will be an inductive energy transmission to the rotor.

The evaluation circuit can for example be integrated in an inverter of the synchronous machine or serve for its control. However, it is also possible to use an evaluation device which is at a distance from the other components of the synchronous machine, for example a central control device of the motor vehicle, when the synchronous machine is used in a motor vehicle.

The communication device can digitally detect measurement values of at least one sensor element of the temperature sensor device in order to provide respective digital temperature data, or it can receive respective digital temperature data from the respective sensor element, wherein the communication device can be adapted to generate the communication signal in dependence on the digital temperature data and/or to send it to the evaluation device. In particular, the communication signal can be a digital communication, so that potentially a greater accuracy and less fault vulnerability of the communication or the temperature acquisition can be achieved.

The temperature sensor device can form in particular an intelligent sensor, which sends a communication signal to the evaluation device only upon fulfillment of a given trigger condition, dependent on the temperature data, for example, or which sends a different communication signal upon fulfillment of the trigger condition than when the trigger condition is not fulfilled. The trigger condition can be fulfilled, for example, when the temperature as described by the temperature data goes beyond a limit value or when such a passing of the limit value occurs during a given interval of time. By preprocessing of the sensor data in an intelligent sensor, the quantity of information transmitted to the evaluation device can be significantly reduced, so that on the one hand the robustness of the communication can be enhanced and on the other hand lower requirements for the communication parameters can be achieved, i.e., the bandwidth which must be available for the transmission of the communication signals, for example, or the required voltage swing of the modulated signal.

The use of an intelligent sensor can also be advantageous, for example, in order to facilitate a data preparation for multiple evaluation devices or in order to make it easier for the evaluation device to communicate with different sensors or other devices used in the motor vehicle. For example, the temperature sensor device or the communication device can communicate across a network protocol or the like, for example through Ethernet. This makes it possible, for example, for the evaluation device to specifically address the communication device and thus the temperature sensor device, for example in order to specifically retrieve the temperatures in the rotor. The temperature sensor device can thus provide information or network-callable functions in a communication network of the motor vehicle, for example.

Alternatively, however, it is also possible to use a proprietary or relatively simple protocol for the communication between the communication device and the evaluation device. For example, in one simple example, the evaluation device can modulate a communication signal with different pulse widths or frequencies on the power supply pathway, according to whether or not a trigger condition is fulfilled.

For coupling the communication signal into the power supply pathway, a quasi-periodic signal with a fixed carrier frequency can be added to the voltage present there, for example, and these signals can be used by customary modulation methods, such as frequency modulation, phase modulation and/or amplitude modulation, especially quadrature amplitude modulation, for the transmission of digital data in particular.

The temperature sensor device can comprise multiple sensor elements, which are arranged at a distance from each other on and/or in the rotor, the generating and/or sending of the communication signal being dependent on the temperature data of the multiple sensor elements. For example, the communication signal can be sent or the sent communication signal can only be changed when at least one of the temperatures as described by the temperature data exceeds a limit value. However, it is also possible for such a changing or such a sending to occur only when temperatures of several of the sensor elements exceed a limit value or a respective limit value, or the like. It is also possible for the respective communication signal to encompass all temperature data or for the evaluation device to dictate, by a corresponding query, for example, which temperatures of which sensor elements will be provided.

The power supply pathway can comprise at least one slip ring of the rotor and one contact element electrically and mechanically contacting the slip ring, especially a brush, of the stator and/or vice versa, while the transmission route for the transmission of the communication signal includes the slip ring or the contact element. Typically, two pairs of slip ring and contact element are used to take the current through the exciter winding. The use of slip rings for the energy transmission between stator and rotor is especially favorable and efficient in terms of design space. Since an essentially constant direct current is taken through the exciter winding during the operation of the synchronous machine, it is relatively simple on the side with the evaluation device or through a decoupling element hooked up between the evaluation device and the power supply pathway to separate the communication signal or its modulated carrier frequency from the direct current or the DC voltage component.

Alternatively, it is possible for the energy transmission pathway to comprise an inductive energy transmission from an energy transmission element of the stator to an energy transmission element of the rotor, while the transmission route for the transmission of the communication signal includes the energy transmission elements. The energy transmission elements can be coils, in particular, and a stator-side coil in particular can generate an alternating field oriented in the axial direction of the synchronous machine, resulting in an induction in a coil forming the rotor-side energy transmission element.

An inductive energy transmission can be advantageous, since it is free of wear and additional friction forces can be avoided by the contact of a slip ring with a brush. Because of the required rectifications in the rotor, however, an inductive energy transmission typically results in greater use of design space and higher costs, so that depending on the application an energy supply by a slip ring or an inductive energy supply may be advantageous.

As already mentioned in the beginning, the frequency band used for the transmission of the communication signal, i.e., in particular a carrier frequency of the communication signal, should be sufficiently far away from the frequency which is used for the inductive energy transmission. Preferably, the frequency which is used for the inductive energy transmission is chosen to be much larger than the carrier frequency or the frequency range within which the communication signal is transmitted. After rectification or demodulation at the stator side in regard to the frequency used for the inductive energy transmission, there remains therefore a modulation of the current strength or voltage transmitting the communication signal.

Preferably, the evaluation device can be adapted to control the operation of the synchronous machine in dependence on the reception and/or the content of the communication signal.

In particular, the evaluation device can be adapted, in dependence on the reception and/or the content of the communication signal, on the one hand to actuate a power inverter of the synchronous machine in order to dictate the field strength and/or the phase position of an alternating magnetic field of at least one stator winding of the synchronous machine, and/or on the other hand to actuate the exciter circuit to dictate the field strength of the exciter winding. The described measures can serve, in particular, for reducing the power of the synchronous machine upon receiving a communication signal which describes high temperatures or a fulfillment of a trigger condition. This can occur, on the one hand, in that the exciter field or the field strength of the stator windings is reduced. The changing of a phase position corresponds, for example, during a vector control of the synchronous machine, to a shifting from a quadrature to a direct field or vice versa, by which the torque of the synchronous machine and therefore also its power can be changed.

Besides the externally excited synchronous machine according to the disclosure, the disclosure relates to a motor vehicle, comprising an externally excited synchronous machine according to the disclosure. As was already explained, externally excited synchronous machines are very suitable especially as the main drive of a motor vehicle. It is highly relevant here to minimize the use of design space, the weight and the costs of the synchronous machine, while at the same time a high power capability is required. In order to accomplish this, it is highly relevant to monitor the rotor temperature with high precision and at the same time with the least possible use of design space and costs. As explained above, this is exactly what is accomplished in the externally excited synchronous machine according to the disclosure.

BRIEF DESCRIPTION OF THE SEVERAL VIEWS OF THE DRAWINGS

Further benefits and details of the disclosure will emerge from the following exemplary embodiments as well as the accompanying drawings.

DETAILED DESCRIPTION

Figure 1:
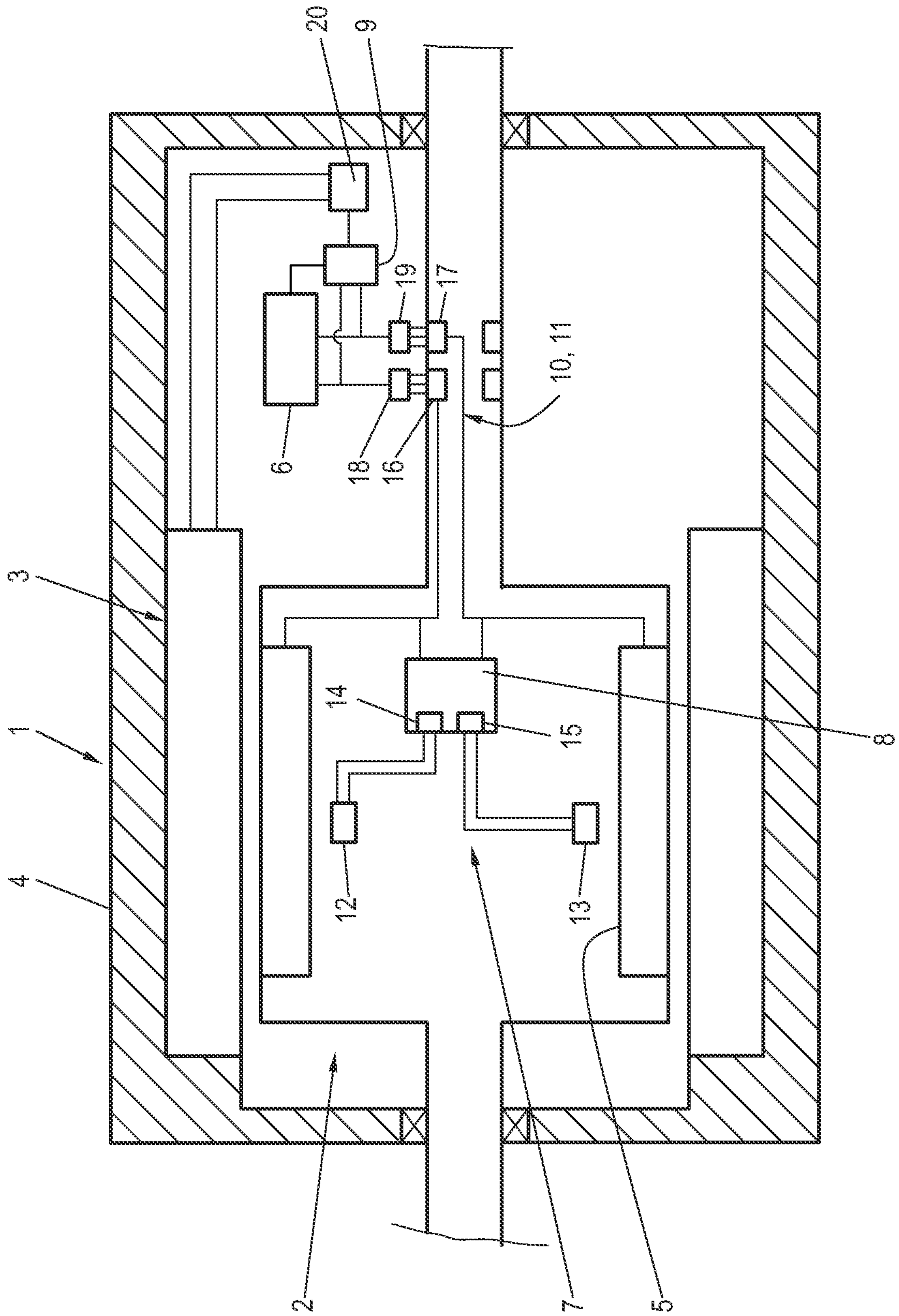
FIG. 1 shows an exemplary embodiment of an externally excited synchronous machine according to the disclosure.

FIG. 1 shows schematically an externally excited synchronous machine 1 having a rotor 2 and a stator 4. The rotor 2 in usual fashion comprises at least one exciter winding 5 for generating an exciter field, which can be energized by an exciter circuit 6 along a power supply pathway 10. The exciter circuit 6 is fixed at the stator. The energy transmission to the rotatable rotor 2 occurs in the example through slip rings 16, 17 of the rotor 2 and contact elements 18, 19 of the stator contacting them electrically and mechanically, which can be brushes, for example. The stator windings 3 of the stator can be energized in customary manner by a power inverter 20.

As already explained in the general section, such an externally excited synchronous machine 1 is typically rotor-critical, that is, the heaviest thermal loads occur in the rotor, so that the control of the synchronous machine 1, i.e., in particular the providing of the exciter current by the exciter circuit 6 or the current for the stator windings 3 by the power inverter 20, should be done in dependence on the temperature or the temperatures in the rotor 2, in order to avoid an overheating of the rotor and thus possible damage.

Therefore, a temperature sensor device 7 is arranged in the rotor 2, which serves, or its communication device 8 serves, for the transmission of a communication signal regarding the temperature of the rotor 2 to an evaluation device 9. The evaluation device 9 can then control the power inverter 20 in dependence on the temperature signal, in particular, in order to dictate the field strength and/or phase position of an alternating magnetic field of at least one of the stator windings 3 of the synchronous machine 1, and/or to control the exciter circuit 6 in order to dictate the field strength of the exciter winding.

In the example, the evaluation devices 9, the power inverter 20 and the exciter circuit 6 are arranged as separate components inside a housing of the stator 4 or the synchronous machine 1. However, it is also possible to configure at least parts of these components in common, for example, to integrate the evaluation device 9 in the exciter circuit 6 or the power inverter 20 or to integrate the exciter circuit 6 in the power inverter 20 or the like.

In addition or alternatively, some or all of the mentioned components can also be arranged outside the stator 4 or a housing of the synchronous machine 1. Thus, for example, when using the synchronous machine 1 in a motor vehicle, it would be possible for the evaluation device 9 to be a control device of the motor vehicle, which can also be situated at a distance from the other components of the synchronous machine 1 and which can also perform other control tasks in the motor vehicle, for example.

Basically, it would be possible to take the communication signals of the temperature sensor device 7 or the communication device 8 for example across separate slip contacts to the evaluation device 9. However, this would result in increased use of design space, greater weight of the synchronous machine 1, and more friction between stator 4 and rotor 2.

In order to avoid these drawbacks, the transmission route 10 in the synchronous machine 1 by which the communication signal is transmitted from the communication device 8 to the evaluation device 9 is formed in part by a section of the power supply pathway 11 which, as explained above, serves for the energizing of the exciter winding 5. Thus, the transmission route 10 for the communication signal includes the same slip rings 16, 17 and contact elements 18, 19 as the power supply pathway 11. This can be accomplished by powerline communication approaches known from other fields of application, such as the field of home networking.

For this, for example, a voltage drop in the power supply pathway 11 or for example between the slip rings 16, 17 can be slightly modulated by the communication device 8. For the circuitry shown in the example, this can be accomplished, for example, in that the current line leading from the slip rings 16, 17 to the exciter winding 5 can be switched in addition by the communication device 8 across a resistor or a controllable resistor, so that the impedance in the power supply pathway 11 or between the slip rings 16, 17 can be modulated.

For example, if an essentially constant current is provided by the exciter circuit 6 during the operation of the synchronous machine 1, a modulation of the impedance between the slip rings 16, 17 will result in a modulation of the voltage drop there, which can be detected in the present example by the evaluation device 9. By suitable dimensioning of the switchable or variable resistor of the communication device 8, it can be achieved that this modulation is relatively slight as compared to the total voltage drop. Furthermore, if a modulation is done at adequate frequency, this will not influence the exciter current or therefore the exciter field strength on account of the inductance of the exciter winding 5, from which a filter effect results, or such influencing can be disregarded. The explained method of powerline communication is merely an example and other known approaches can be used for this purpose.

In the example, a relatively simple communication occurs between the communication device 8 and the evaluation device 9. The communication signal here will only describe whether a high temperature of the rotor 2 is present at the moment, requiring an adapted operation of the synchronous machine 1, or not. In this case, a rather simple proprietary communication protocol can be used. For example, the impedance or voltage in the power supply pathway 11 can be modulated with a different frequency and/or a different pulse width depending on whether a trigger condition evaluated by the communication device 8 is fulfilled.

However, more complex communication is possible in addition or alternatively. For example, a bidirectional communication may be possible between the communication device 8 and the evaluation device 9, where conventional communication protocols such as an Ethernet or TCP/IP connection can be taken or "tunneled" along the power supply pathway 11. This may be advisable, for example, in order to allow a specific reading out of the rotor temperature by the evaluation device 9 or for example in order to separately interrogate the temperature values at different sensor elements 12, 13 of the temperature sensor device 7 as needed.

The temperature in the rotor 2 is detected in the example by separate sensor elements 12, 13 at multiple points of the rotor at a distance from each other. The communication signal here depends on the temperature data of the multiple sensor elements 12, 13, and for example the above explained trigger condition can then always be fulfilled if the temperature data of at least one of the sensor elements 12, 13 indicates a local temperature which is too high and thus exceeds a limit value. However, it is also possible for the communication signal to describe all acquired temperature data.

The measurement values of the sensor elements 12, 13 are digitally acquired in the example, in order to provide digital temperature data, depending on which the communication signal is generated. The acquisition or digitization of the measurement values is done in the example by separate analog-digital converters 14, 15 of the communication device 8, by which the sensor elements 12, 13 can be configured for example as thermal resistors, which are energized by the communication device 8, and the voltage drop at the particular thermal resistor is acquired as a measurement value by the analog-digital converters 14, 15. Alternatively, it would also be possible, for example, to use only one analog-digital converter which acquires in succession the measurement values of the different sensor elements 12, 13 with the aid of a multiplexer. It would also be possible for the sensor elements 12, 13 to directly provide digital measurement data.

Figure 2:
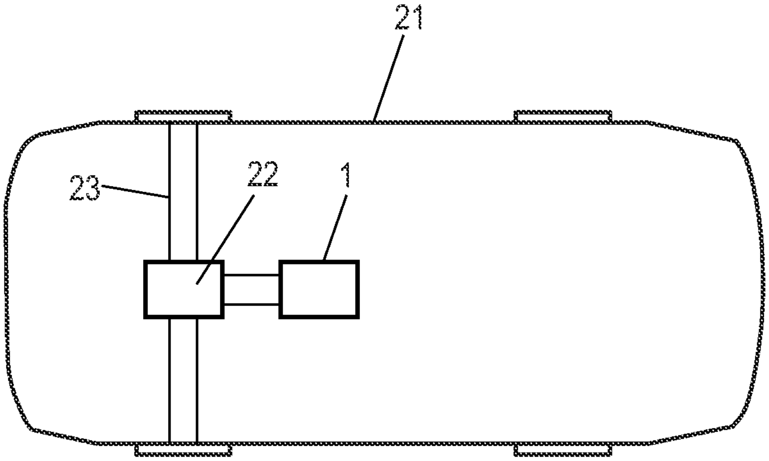
FIG. 2 shows an exemplary embodiment of a motor vehicle according to the disclosure.

As already explained in the general section, the temperature acquisition by a rotor-side temperature sensor device 7 and the co-opting of part of the power supply pathway 11 as part of the transmission route 10 for the transmission of the communication signals makes it possible to design high-performance externally excited synchronous machines 1 in an especially compact, light and advantageous manner. This is relevant, for example, when the synchronous machine 1 is supposed to be used as the main drive machine in a motor vehicle 21, as shown for example in FIG. 2. In the example shown, the synchronous machine 1 is coupled by a differential 22 to the rear axle 23 in order to drive the motor vehicle 21.

Figure 3:
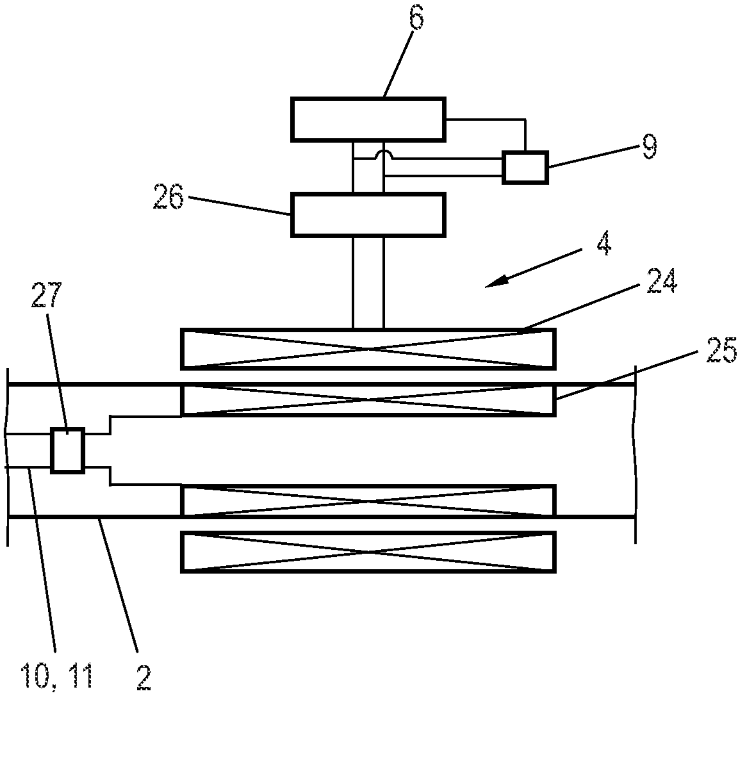
FIG. 3 shows a detail view of another exemplary embodiment of an externally excited synchronous machine according to the disclosure.

The explained approach of using a temperature sensor device 7 in the rotor 2, where the transmission route 10 for the transmission of the communication signals of the temperature sensor device 7 is formed at least in part by a power supply pathway 11 for the exciter winding 5, can also be applied to synchronous machines which employ an inductive energy transmission between a stator-side exciter circuit 6 and the rotor 2. A detail view of one example of such a synchronous machine is shown in FIG. 3.

The energy transmission pathway 11 here comprises energy transmission elements 24, 25 at the rotor side and the stator side, which may be coils for example. In the configuration shown, at first a direct current is provided by the exciter circuit 6 in usual manner and this is converted by an inverter 26 into an alternating current. The energy transmission element 24 is a coil which produces, thanks to the energization with the alternating current, an alternating electric field in the axial direction of the synchronous machine, i.e., in the transverse direction in FIG. 3. This alternating field is thus coupled into the energy transmission element 25, likewise formed by a coil, basically independently of the rotation position of the rotor 2, so that an alternating voltage or an alternating current results, which can be rectified by a rectifier 27.

The further components of the rotor 2 can be configured as was explained in regard to FIG. 1. For example, as explained in regard to FIG. 1, if a switchable or variable resistor is used by the communication device 8 between the terminal lines of the power supply pathway 11, this will modulate the overall impedance of the system energized by the exciter circuit 6 and the resulting voltage drop varying in time can be detected by the evaluation device 9.

For the layout of the transmission route 10 which is shown, the frequency range or the carrier frequency of the communication signal should be chosen such that it lies significantly below the frequency provided by the inverter 26 for the energy transmission. Alternatively, in an example not shown, it would be possible to couple in the communication signal between the energy transmission element 26 and the rectifier 27 and to pick it off at the stator side by the evaluation device 9 between the inverter 26 and the energy transmission element 24. In this case, the communication signal would be modulated onto an alternating voltage, in which case it may be advantageous to select the carrier frequency of the communication signal significantly above the frequency used for the energy transmission.

German patent application no. 102022116680.5, filed Jul. 5, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An externally excited synchronous machine, comprising:

an exciter circuit;

a stator; and a rotor that carries at least one exciter winding which, in operation, generates an exciter field, wherein the exciter winding, in operation, is excited by the exciter circuit along terminal lines of a power supply pathway, wherein the rotor includes at least one temperature sensor device, and a communication device which, in operation, transmits a communication signal regarding a temperature of the rotor to at least one evaluation device, and wherein the communication signal is transmitted from the communication device to the evaluation device by a transmission route at least partially formed by a section of the terminal lines of the power supply pathway along which the exciter winding is excited by the exciter circuit.

2. The externally excited synchronous machine according to claim 1, wherein the communication device, in operation, detects measurement values of at least one sensor element of the at least one temperature sensor device using at least one analog-digital converter and provides temperature data, or receives the temperature data from the at least one sensor element, and wherein the communication device, in operation, generates the communication signal based on the temperature data.

3. The externally excited synchronous machine according to claim 2, wherein the at least one temperature sensor device includes multiple sensor elements arranged at a distance from each other on or in the rotor, and wherein the communication signal is based on the temperature data of the multiple sensor elements.

4. The externally excited synchronous machine according to claim 1, wherein the power supply pathway includes at least one slip ring of the rotor and a contact element that electrically and mechanically contacts the at least one slip ring, and wherein the transmission route of the communication signal includes the slip ring and the contact element.

5. The externally excited synchronous machine according to claim 4, wherein the contact element is a brush of the stator.

6. The externally excited synchronous machine according to claim 1, wherein the power supply pathway includes an inductive energy transmission from an energy transmission element of the stator to an energy transmission element of the rotor, and wherein the transmission route of the communication signal includes the energy transmission element of the stator and the energy transmission element of the rotor.

7. The externally excited synchronous machine according to claim 1, wherein the evaluation device, in operation, controls the synchronous machine based on the communication signal.

8. The externally excited synchronous machine according claim 1, further comprising:

a power inverter, wherein the evaluation device, in operation, actuates the power inverter, based on the communication signal, and controls a field strength or a phase position of an alternating magnetic field of at least one stator winding of the synchronous machine, or actuates the exciter circuit to and controls a field strength of the exciter winding.

9. A motor vehicle, comprising the externally excited synchronous machine according to claim 1.

10. The externally excited synchronous machine according claim 2, wherein the communication device, in operation, sends the communication signal to the evaluation device only upon fulfillment of a given trigger condition, and wherein the given trigger condition is fulfilled when a temperature as described by the temperature data goes beyond a limit value.

11. The externally excited synchronous machine according claim 1, wherein the communication device, in operation, modulates the communication signal onto an alternating voltage, and a carrier frequency of the communication signal is greater than a frequency used for energy transmission to the rotor.

12. The externally excited synchronous machine according claim 1, wherein the communication device, in operation, receives an interrogation signal from the evaluation device via the section of the terminal lines of the power supply pathway along which the exciter winding is excited by the exciter circuit.

13. The externally excited synchronous machine according claim 1, wherein the communication device includes a variable resistor between the terminal lines of the power supply pathway, and wherein the communication device, in operation, modulates the communication signal using the variable resistor.

* * * * *